United States Patent
Wu et al.

(10) Patent No.: US 10,165,458 B2
(45) Date of Patent: *Dec. 25, 2018

(54) INTER-OPERABILITY TEST INDICATION FOR UPLINK-DOWNLINK CONFIGURATION COMBINATIONS FOR PRIMARY CELL AND SECONDARY CELL FOR WIRELESS NETWORKS USING CARRIER AGGREGATION

(71) Applicant: Nokia Solutions and Networks Oy, Espoo (FI)

(72) Inventors: Chunli Wu, Beijing (CN); Woonhee Hwang, Espoo (FI); Chun Hai Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 30 days.

This patent is subject to a terminal disclaimer.

(21) Appl. No.: 15/234,022

(22) Filed: Aug. 11, 2016

(65) Prior Publication Data

US 2016/0353303 A1   Dec. 1, 2016

Related U.S. Application Data

(63) Continuation of application No. 14/602,436, filed on Jan. 22, 2015, now Pat. No. 9,451,490.

(30) Foreign Application Priority Data

Jan. 24, 2014  (WO) ................ PCT/CN2014/071333

(51) Int. Cl.
*H04W 24/08* (2009.01)
*H04L 5/00* (2006.01)
*H04L 5/14* (2006.01)

(52) U.S. Cl.
CPC ............. *H04W 24/08* (2013.01); *H04L 5/001* (2013.01); *H04L 5/14* (2013.01)

(58) Field of Classification Search
CPC ........... H04W 24/08; H04L 5/001; H04L 5/14
See application file for complete search history.

(56) References Cited

U.S. PATENT DOCUMENTS

| 9,451,490 B2* | 9/2016 | Wu ......................... H04L 5/001 |
| 2010/0042716 A1* | 2/2010 | Farajidana ............ H04W 16/10 |
| | | 709/224 |

(Continued)

FOREIGN PATENT DOCUMENTS

| CN | 102986275 A | 3/2013 |
| CN | 103270787 A | 8/2013 |

(Continued)

OTHER PUBLICATIONS

Interdigital Communications, LLC; "Cross-carrier scheduling for TDD Inter-Band CA"; R1-121307; 3GPP TSG-RAN WG1 Meeting #68bis; Jeju, Korea, Mar. 26-30, 2012; whole document (6 pages).

(Continued)

*Primary Examiner* — Albert T Chou
(74) *Attorney, Agent, or Firm* — Harrington & Smith

(57) ABSTRACT

A technique is provided to control transmitting, by a mobile station (MS) that uses carrier aggregation, a message including an interoperability test (IOT) indication for one or more uplink-downlink (UL-DL) configuration combinations of time-division-duplex (TDD) radio frames for use by a primary cell and a secondary cell. In one example implementation, an IOT indication may be provided for one or more (or each) uplink-downlink configuration combinations (e.g., one IOT indication per UL-DL configuration combination). In another example implementation, an IOT indication may be provided for one or more sets of uplink- (Continued)

Example of Intra-BS Carrier Aggregation downlink configuration combinations, where each set may include a plurality of UL-DL configuration combinations.

19 Claims, 11 Drawing Sheets

(56) References Cited

U.S. PATENT DOCUMENTS

| | | |
|---|---|---|
| 2012/0281601 A1 | 11/2012 | Kuo et al. |
| 2013/0039232 A1* | 2/2013 | Kim .................. H04L 5/14 370/280 |
| 2013/0188532 A1 | 7/2013 | Zhang et al. |
| 2013/0258864 A1 | 10/2013 | Chen et al. ............... 370/241 |
| 2013/0272169 A1 | 10/2013 | Wang et al. .............. 370/280 |
| 2013/0315114 A1 | 11/2013 | Seo et al. |
| 2015/0289218 A1 | 10/2015 | Uchino ..................... 370/329 |

FOREIGN PATENT DOCUMENTS

| | | |
|---|---|---|
| RU | 2354061 C2 | 4/2009 |
| WO | WO-2011087448 A1 | 7/2011 |
| WO | WO-2012063138 A1 | 5/2012 |
| WO | WO-2012083850 A1 | 6/2012 |
| WO | WO-2013/027395 A1 | 2/2013 |

OTHER PUBLICATIONS

ZTE; "HARQ timing of PDSCH on cross-carrier scheduled SCell for TDD CA with different UL-DL configurations"; R1-122110; 3GPP TSG RAN WG1 Meeting #69; Prague, Czech Republic, May 21-25, 2012; whole document (7 pages).

R1-113136, Nokia Siemens Networks, et al., "Views on inter-band CA with different TDD configurations on different bands", 3GPP TSG-RAN WG1 Meeting #66bis, Zhuhai, China, Oct. 10-14, 2011.

RP-131748, Qualeomrn Incorporated, "IOT bit for inter-band TDD CA with different Ulidl configurations", 3GPP TSG-RAN meeting #62, Busan, South Korea, Dec. 3-6, 2013.

3GPP TS 36.211 V12.0.0 (Dec. 2013), $3^{rd}$ Generation Partnership Project, Technical Specification Group Radio Access Network, Evolved Universal Terrestrial Radio Access (E-UTRA), Physical channels and modulation (Release 12).

* cited by examiner

| Pcell and Scell UL-DL Configuration combination | | Pcell SIB-1 UL-DL Configuration | | | | | | |
|---|---|---|---|---|---|---|---|---|
| | | 0 | 1 | 2 | 3 | 4 | 5 | 6 |
| Scell SIB-1 UL-DL Configuration | 0 |   | A | A | A | A | A | A |
| | 1 | B |   | A | C | A | A | B |
| | 2 | B | C |   | C | C | A | B |
| | 3 | B | B | C |   | A | A | B |
| | 4 | B | B | B | B |   | A | B |
| | 5 | B | A | A | A | B |   | B |
| | 6 | B | A | A | A | A | A |   |

Combination Case A: SCell DL subframes are a subset of Pcell by SIB1 configuration
Combination Case B: SCell DL subframes are a superset of Pcell by SIB1 configuration
Combination Case C: SCell DL subframes are neither superset nor subset of Pcell by SIB1 configuration

FIG. 4

| PDSCH HARQ timing on Scell follows TDD UL-DL configuration# | | Pcell SIB-1 UL-DL Configuration | | | | | | |
|---|---|---|---|---|---|---|---|---|
| | | 0 | 1 | 2 | 3 | 4 | 5 | 6 |
| Scell SIB-1 UL-DL Configuration | 0 | | A1 | A2 | A3 | A4 | A5 | A6 |
| | 1 | B1 | | A2 | C4 | A4 | A5 | B1 |
| | 2 | B2 | B2 | | C5 | C5 | A5 | B2 |
| | 3 | B3 | C4 | C5 | | A4 | A5 | B3 |
| | 4 | B4 | B4 | C5 | B4 | | A5 | B4 |
| | 5 | B5 | B5 | B5 | B5 | B5 | | B5 |
| | 6 | B6 | A1 | A2 | A3 | A4 | A5 | |
| Notes: The number in the grid is the reference UL-DL configuration which SCell PDSCH HARQ timing follows. | | | | | | | | |

DL HARQ timing (DL data, UL Ack/Naks) with self (or same carrier)-scheduling

FIG. 5

| PDSCH HARQ timing on Scell follows TDD UL-DL configuration# | | Pcell SIB-1 UL-DL Configuration | | | | | | |
|---|---|---|---|---|---|---|---|---|
| | | 0 | 1 | 2 | 3 | 4 | 5 | 6 |
| Scell SIB-1 UL-DL Configuration | 0 | | A1 | A2 | A3 | A4 | A5 | A6 |
| | 1 | B0 | | A2 | C3 | A4 | A5 | B6 |
| | 2 | B0 | B1 | | C3 | C4 | A5 | B6 |
| | 3 | B0 | C1 | C2 | | A4 | A5 | B6 |
| | 4 | B0 | B1 | C2 | B3 | | A5 | B6 |
| | 5 | B0 | B1 | B2 | B3 | B4 | | B6 |
| | 6 | B0 | A1 | A2 | A3 | A4 | A5 | |

Notes: *The number in the grid is the reference UL-DL configuration which SCell PDSCH HARQ timing follows.*

DL HARQ timing (DL data, UL Ack/Naks) with Cross-Carrier scheduling

FIG. 6

| HARQ/Scheduling timing of PUSCH on Scheduled Cell follows TDD UL-DL Configuration# | | Scheduling cell SIB-1 UL-DL Configuration | | | | | | |
|---|---|---|---|---|---|---|---|---|
| | | 0 | 1 | 2 | 3 | 4 | 5 | 6 |
| Scheduled cell SIB-1 UL-DL Configuration | 0 | | B0 | B0 | A0 | B0 | B0 | D0 |
| | 1 | D1 | | B1 | C1 | B1 | B1 | D1 |
| | 2 | D2 | A2 | | C2 | C2 | B2 | D2 |
| | 3 | D3 | C3 | C3 | | B3 | B3 | D3 |
| | 4 | D4 | A4 | C4 | A4 | | B4 | D4 |
| | 5 | D5 | A5 | A5 | A5 | A5 | | D5 |
| | 6 | D6 | B6 | B6 | B6 | B6 | B6 | |

Notes: The number in the grid is the reference UL-DL configuration which Scell PUSCH HARQ timing follows.

UL HARQ timing (UL data, DL Ack/Naks) with Self (same carrier) scheduling

FIG. 7

| HARQ/Scheduling timing of PUSCH on Scheduled Cell follows TDD UL-DL Configuration# | | Scheduling cell SIB-1 UL-DL Configuration | | | | | | |
|---|---|---|---|---|---|---|---|---|
| | | 0 | 1 | 2 | 3 | 4 | 5 | 6 |
| Scheduled cell SIB-1 UL-DL Configuration | 0 | | B0 | B0 | B0 | B0 | B0 | D0 |
| | 1 | D1 | | B1 | C1 | B1 | B1 | D1 |
| | 2 | D1 | A1 | C3 | C2 | C2 | B2 | D1 |
| | 3 | D3 | C3 | | A3 | B3 | B3 | D3 |
| | 4 | D1 | A1 | C4 | A3 | | B4 | D4 |
| | 5 | D1 | A1 | A2 | A3 | A4 | | D1 |
| | 6 | D6 | B6 | B6 | B6 | B6 | B6 | |

Notes: The number in the grid is the reference UL-DL configuration which Scell PUSCH HARQ timing follows.

UL HARQ timing (UL data, DL Ack/Naks) with Cross-carrier scheduling

FIG. 8

INTER-OPERABILITY TEST INDICATION FOR UPLINK-DOWNLINK CONFIGURATION COMBINATIONS FOR PRIMARY CELL AND SECONDARY CELL FOR WIRELESS NETWORKS USING CARRIER AGGREGATION

CROSS REFERENCE TO RELATED APPLICATION

This is a continuation patent application of co-pending application Ser. No. 14/602,436 filed Jan. 22, 2015, which is hereby incorporated by reference in its entirety, and which claims priority to PCT international application No. PCT/CN2014/071333, filed Jan. 24, 2014.

TECHNICAL FIELD

This description relates to wireless networks, and in particular relates to inter-operability test (IOT) indication for uplink-downlink configuration combinations for wireless networks that use carrier aggregation.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to, as enhanced Node Bs (eNBs), provide wireless access within a coverage area or cell. In LTE, mobile devices, or mobile stations are referred to as a user equipment (UE). LTE has included a number of improvements or developments.

There may be many different manufacturers of wireless systems, e.g., hardware and software of a MS or BS. LTE and other wireless standards include many different requirements. Inter-operability testing may be performed to test devices and systems for MSs and BSs to ensure that such systems are compliant with, and operate according to, the requirements of the standard, for example. Thus, after an interoperability test has been performed for a system or device (e.g., wireless system as part of a MS or BS), some assurance is provided that such device or system will operate and function in accordance with the standard and, therefore, be inter-operable with devices and systems from other manufacturers.

SUMMARY

According to an example implementation, a method may include control transmitting, by a mobile station (MS) that uses carrier aggregation, a message including one or more interoperability test (IOT) indications for a plurality of uplink-downlink configuration combinations of time-division-duplex (TDD) radio frames for use by a primary cell and a secondary cell, wherein one or more of the uplink-downlink configuration combinations includes a first uplink-downlink configuration for the primary cell to use and a second uplink-downlink configuration for the secondary cell to use. The message may include a first IOT indication that indicates whether or not a first set of uplink-downlink configuration combinations for use by the primary cell and the secondary cell for the MS have been IOT tested.

According to an example implementation of the method, the first set of uplink-downlink configuration combinations may include all possible uplink-downlink configuration combinations, or may include a subset of all possible uplink-downlink configuration combinations.

According to an example implementation, the message may further include a second IOT indication that indicates whether or not a second set of uplink-downlink configuration combinations for use by the primary cell and the secondary cell for the MS have been IOT tested.

According to an example implementation, the message may include an IOT field that includes a plurality of bits including a first bit to provide the first IOT indication and a second bit to provide the second IOT indication.

According to an example implementation, each of the uplink-downlink configurations specifies one or more subframes of the radio frame as a downlink subframe and one or more subframes of the radio frame as an uplink subframe.

According to an example implementation, each of the uplink-downlink configurations specifies a configuration of a TDD radio frame, each of the uplink downlink configurations specifying that each subframe within a TDD radio frame is either a uplink subframe, a downlink subframe, or a special subframe.

According to an example implementation, the first set of uplink-downlink configuration combinations include uplink-downlink configuration combinations where downlink subframes of the uplink-downlink configuration for the secondary cell of the combination are a subset of downlink subframes of the uplink-downlink configuration for the primary cell of the combination.

According to an example implementation, the second set of uplink-downlink configuration combinations comprise uplink-downlink configuration combinations where downlink subframes of the uplink-downlink configuration for the secondary cell of the combination are a superset of downlink subframes of the uplink-downlink configuration for the primary cell of the combination.

According to an example implementation, the message further includes a third IOT indication that indicates whether or not a third set of uplink-downlink configuration combinations for use by the primary cell and the secondary cell for the MS have been IOT tested, the third set of uplink-downlink configuration combinations comprise uplink-downlink configuration combinations where downlink subframes of the uplink-downlink configuration for the secondary cell of the combination are neither a subset nor a superset of downlink subframes of the uplink-downlink configuration for the primary cell of the combination.

According to an example implementation, the message includes: a first IOT indication that indicates whether or not a first set of uplink-downlink configuration combinations for use by the primary cell and the secondary cell for the MS have been IOT tested, the first set of uplink-downlink configuration combinations include uplink-downlink configuration combinations where downlink subframes of the uplink-downlink configuration for the secondary cell of the combination are a subset of downlink subframes of the uplink-downlink configuration for the primary cell of the combination; a second IOT indication that indicates whether or not a second set of uplink-downlink configuration combinations for use by the primary cell and the secondary cell for the MS have been IOT tested, the second set of uplink-downlink configuration combinations include uplink-downlink configuration combinations where downlink subframes of the uplink-downlink configuration for the secondary cell of the combination are a superset of downlink subframes of the uplink-downlink configuration for the primary cell of the combination; and a third IOT indication that indicates whether or not a third set of uplink-downlink configuration combinations for use by the primary cell and the secondary cell for the MS have been IOT tested, the third set of uplink-downlink configuration combinations include uplink-downlink configuration combinations where downlink subframes of the uplink-downlink configuration for the secondary cell of the combination are neither a subset nor a superset of downlink subframes of the uplink-downlink configuration for the primary cell of the combination.

According to an example implementation the message may include: a first IOT indication that indicates whether or not a first set of uplink/downlink configuration combinations for use by the primary cell and the secondary cell for the MS have been IOT tested, the first set of uplink-downlink configuration combinations include uplink-downlink configuration combinations where downlink subframes of the uplink-downlink configuration for the secondary cell of the combination are a subset of downlink subframes of the uplink-downlink configuration for the primary cell of the combination; a second IOT indication that indicates whether or not a second set of uplink/downlink configuration combinations for use by the primary cell and the secondary cell for the MS have been IOT tested, the second set of uplink-downlink configuration combinations include uplink-downlink configuration combinations where downlink subframes of the uplink-downlink configuration for the secondary cell of the combination are a superset of downlink subframes of the uplink-downlink configuration for the primary cell of the combination, and UL HARQ timing of primary cell is 10 ms; a third IOT indication that indicates whether or not a third set of uplink/downlink configuration combinations for use by the primary cell and the secondary cell for the MS have been IOT tested, the third set of uplink-downlink configuration combinations include uplink-downlink configuration combinations where downlink subframes of the uplink-downlink configuration for the secondary cell of the combination are neither a subset nor a superset of downlink subframes of the uplink-downlink configuration for the primary cell of the combination; and a fourth IOT indication that indicates whether or not a second set of uplink/downlink configuration combinations for use by the primary mil and the secondary cell for the MS have been IOT tested, the second set of uplink-downlink configuration combinations include uplink-downlink configuration combinations where downlink subframes of the uplink-downlink configuration for the secondary cell of the combination are a superset of downlink subframes of the uplink-downlink configuration for the primary cell of the combination, and UL HARQ timing of primary cell is not 10 ms.

According to an example implementation, the message includes an IOT field that includes a plurality of bits including a first bit to provide the first IOT indication, a second bit to provide the second IOT indication and a third bit to provide the third IOT indication.

According to an example implementation, an apparatus is provided that includes at least one processor and at least one memory including computer instructions, when executed by the at least one processor, cause the apparatus to: control transmitting, by a mobile station (MS) that uses carrier aggregation, a message including one or more interoperability test (IOT) indications for a plurality of uplink-downlink configuration combinations of time-division-duplex (TDD) radio frames for use by a primary cell and a secondary cell, wherein one or more of the uplink-downlink configuration combinations includes a first uplink-downlink configuration for the primary cell to use and a second uplink-downlink configuration for the secondary cell to use. The message includes a first IOT indication that indicates whether or not a first set of uplink-downlink configuration combinations for use by the primary cell and the secondary cell for the MS have been IOT tested.

According to an example implementation, the message further includes a second IOT indication that indicates whether or not a second set of uplink/downlink configuration combinations for use by the primary cell and the secondary cell for the MS have been IOT tested.

According to an example implementation, the message includes an IOT field that includes a plurality of bits including a first bit to provide the first IOT indication and a second bit to provide the second IOT indication.

According to an example implementation, in the apparatus, each of the uplink-downlink configurations specifies one or more subframes of the radio frame as a downlink subframe and one or more subframes of the radio frame as an uplink subframe.

According to an example implementation of the apparatus, each of the uplink-downlink configurations specifies a configuration of a TDD radio frame, each of the uplink downlink configurations specifying that each subframe within a TDD radio frame is either a uplink subframe, a downlink subframe, or a special subframe.

According to an example implementation of the apparatus, the first set of uplink-downlink configuration combinations include uplink-downlink configuration combinations where downlink subframes of the uplink-downlink configuration for the secondary cell of the combination are a subset of downlink subframes of the uplink-downlink configuration for the primary cell of the combination.

According to an example implementation of the apparatus, the second set of uplink-downlink configuration combinations include uplink-downlink configuration combinations where downlink subframes of the uplink-downlink configuration for the secondary cell of the combination are a superset of downlink subframes of the uplink-downlink configuration for the primary cell of the combination.

According to an example implementation, the message further includes a third IOT indication that indicates whether or not a third set of uplink-downlink configuration combinations for use by the primary cell and the secondary cell for the MS have been IOT tested, the third set of uplink-downlink configuration combinations comprise uplink-downlink configuration combinations where downlink subframes of the uplink-downlink configuration for the secondary cell of the combination are neither a subset nor a superset of downlink subframes of the uplink-downlink configuration for the primary cell of the combination.

According to an example implementation, a computer program product is provided that includes a non-transitory computer-readable storage medium and storing executable code that, when executed by at least one data processing apparatus, is configured to cause the at least one data processing apparatus to perform a method including: control transmitting, by a mobile station (MS) that uses carrier aggregation, a message including interoperability test (IOT) indications for a plurality of uplink-downlink configuration combinations of time-division-duplex (TDD) radio frames for use by a primary cell and a secondary cell, wherein one or more of the uplink-downlink configuration combinations includes a first uplink-downlink configuration for the primary cell to use and a second uplink-downlink configuration for the secondary cell to use. The message includes a first IOT indication that indicates whether or not a first set of uplink/downlink configuration combinations for use by the primary cell and the secondary cell for the MS have been IOT tested.

According to another example implantation, an apparatus is provided that includes means for controlling the transmitting, by a mobile station (MS) that uses carrier aggregation, a message including interoperability test (IOT) indications for a plurality of uplink-downlink configuration combinations of time-division-duplex (TDD) radio frames for use by a primary cell and a secondary cell, wherein one or more of the uplink-downlink configuration combinations includes a first uplink-downlink configuration for the primary cell to use and a second uplink-downlink configuration for the secondary cell to use. The message includes a first IOT indication that indicates whether or not a first set of uplink/downlink configuration combinations for use by the primary cell and the secondary cell for the MS have been IOT tested.

According to another example implementation a method includes control transmitting, by a mobile station (MS) that uses carrier aggregation, a message including an interoperability test (IOT) indication for one or more uplink-downlink configuration combinations of time-division-duplex (TDD) radio frames for use by a primary cell and a secondary cell, wherein one or more of the uplink-downlink configuration combinations each includes a first uplink-downlink configuration for the primary cell to use and a second uplink-downlink configuration for the secondary cell to use. The message includes a first IOT indication that indicates whether or not a first uplink-downlink configuration combination for use by the primary cell and the secondary cell for the MS has been IOT tested.

According to another example implementation, the message may further include a second IOT indication that indicates whether or not a second uplink-downlink configuration combination for use by the primary cell and the secondary cell for the MS has been IOT tested.

According to another example implementation, an apparatus is provided that includes at least one processor and at least one memory including computer instructions, when executed by the at least one processor, cause the apparatus to: control transmitting, by a mobile station (MS) that uses carrier aggregation, a message including an interoperability test (IOT) indication for one or more uplink-downlink configuration combinations of time-division-duplex (TDD) radio frames for use by a primary cell and a secondary cell, wherein one or more of the uplink-downlink configuration combinations each includes a first uplink-downlink configuration for the primary cell to use and a second uplink-downlink configuration for the secondary cell to use. The message may include a first IOT indication that indicates whether or not a first uplink-downlink configuration combination for use by the primary cell and the secondary cell for the MS has been IOT tested.

According to another example implementation, a computer program product is provided, the computer program product including a non-transitory computer-readable storage medium and storing executable code that, when executed by at least one data processing apparatus, is configured to cause the at least one data processing apparatus to perform a method including: control transmitting, by a mobile station (MS) that uses carrier aggregation, a message including an interoperability test (IOT) indication for one or more uplink-downlink configuration combinations of time-division-duplex (TDD) radio frames for use by a primary cell and a secondary cell, wherein one or more of the uplink-downlink configuration combinations each includes a first uplink-downlink configuration for the primary cell to use and a second uplink-downlink configuration for the secondary cell to use. The message may include a first IOT indication that indicates whether or not a first uplink-downlink configuration combination for use by the primary cell and the secondary cell for the MS has been IOT tested.

According to another example implementation, an apparatus may includes means for control transmitting, by a mobile station (MS) that uses carrier aggregation, a message including an interoperability test (IOT) indication for one or more uplink-downlink configuration combinations of time-division-duplex (TDD) radio frames for use by a primary cell and a secondary cell, wherein one or more of the uplink-downlink configuration combinations each includes a first uplink-downlink configuration for the primary cell to use and a second uplink-downlink configuration for the secondary cell to use. The message may include a first IOT indication that indicates whether or not a first uplink-downlink configuration combination for use by the primary cell and the secondary cell for the MS has been IOT tested.

The details of one or more implementations are set forth in the accompanying drawings and the description below. Other features will be apparent from the description and drawings, and from the claims.

BRIEF DESCRIPTION OF THE DRAWINGS

FIG. 4 is a chart that identifies the uplink-downlink (UL-DL) configuration combinations for each of three sets of configuration combinations according to an example implementation.

FIG. 5 is a chart identifying reference UL-DL configurations to be used by a secondary cell (SCell) for DL HARQ timing for same-carrier scheduling according to an example implementation.

FIG. 6 is a chart identifying reference UL-DL configurations to be used by a secondary cell (SCell) for DL HARQ timing for Cross-Carrier scheduling according to an example implementation.

FIG. 7 is a chart identifying reference UL-DL configurations to be used by a scheduled cell for UL HARQ timing for same-carrier scheduling according to an example implementation.

FIG. 8 is a chart identifying reference UL-DL configurations to be used by a scheduled cell for UL HARQ timing for Cross-Carrier scheduling.

DETAILED DESCRIPTION

Figure 1:
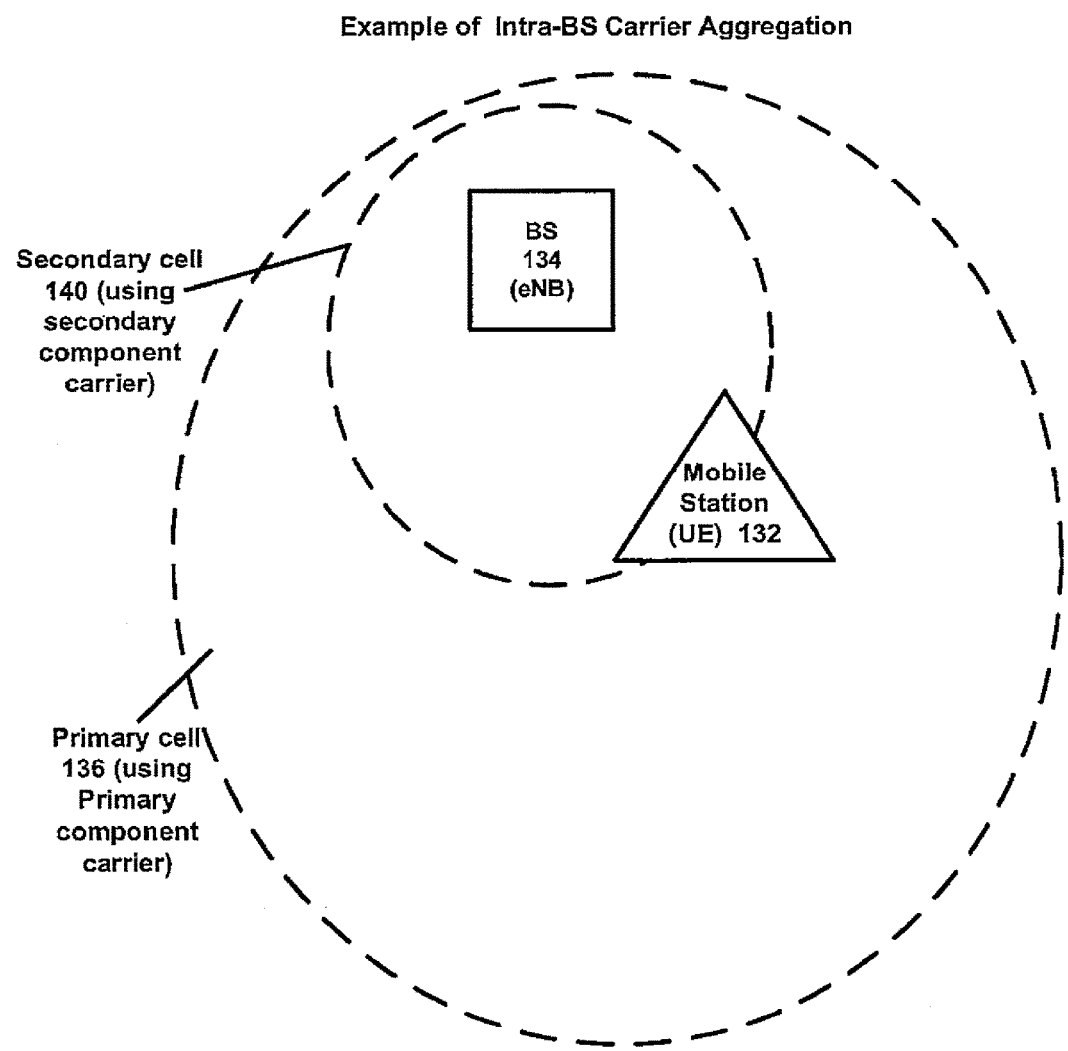
FIG. 1 is a block diagram of a dual connectivity wireless network 130 according to an example implementation.

Various example implementations are disclosed to provide inter-operability test (IOT) indications for one or more uplink-downlink configuration combinations for carrier aggregation, or alternatively, IOT indications for sets of UL-DL configuration combinations.

An example technique is provided to transmit or control transmitting, by a mobile station (MS) that uses carrier aggregation, a message including an interoperability test (IOT) indication for one or more uplink-downlink (UL-DL) configuration combinations of time-division-duplex (TDD) radio frames for use by a primary cell and a secondary cell. In one example implementation, an IOT indication may be provided for one or more (or each) uplink-downlink configuration combinations (e.g., one IOT indication per UL-DL configuration combination). In another example implementation, an IOT indication may be provided for one or more sets of uplink-downlink configuration combinations, where each set may include a plurality of UL-DL configuration combinations.

According to an example implementation, a technique may include transmitting or control transmitting, by a mobile station (MS) that uses carrier aggregation, a message including an interoperability test (IOT) indication for one or more uplink-downlink configuration combinations of time-division-duplex (TDD) radio frames for use by a primary cell and a secondary cell, wherein one or more of the uplink-downlink configuration combinations each includes a first uplink-downlink configuration for the primary cell to use and a second uplink-downlink configuration for the secondary cell to use, the message including a first IOT indication that indicates whether or not a first uplink-downlink configuration combination for use by the primary cell and the secondary cell for the MS has been IOT tested.

According to another example implementation, a technique may include transmitting or control transmitting, by a mobile station (MS) that uses carrier aggregation, a message including one or more interoperability test (IOT) indications for a plurality of uplink-downlink configuration combinations of time-division-duplex (TDD) radio frames for use by a primary cell and a secondary cell, wherein one or more of the uplink-downlink configuration combinations includes a first uplink-downlink configuration for the primary cell to use and a second uplink-downlink configuration for the secondary cell to use, the message including a first IOT indication that indicates whether or not a first set of uplink-downlink configuration combinations for use by the primary cell and the secondary cell for the MS have been IOT tested.

According to another example implementation, the message may provide IOT indications for a plurality of sets of UL-DL configuration combinations. The message may include, for example: a first IOT indication that indicates whether or not a first set of uplink-downlink configuration combinations for use by the primary cell and the secondary cell for the MS have been IOT tested, the first set of uplink-downlink configuration combinations include uplink-downlink configuration combinations where downlink subframes of the uplink-downlink configuration for the secondary cell of the combination are a subset of downlink subframes of the uplink-downlink configuration for the primary cell of the combination, a second IOT indication that indicates whether or not a second set of uplink/downlink configuration combinations for use by the primary cell and the secondary cell for the MS have been IOT tested, the second set of uplink-downlink configuration combinations include uplink-downlink configuration combinations where downlink subframes of the uplink-downlink configuration for the secondary cell of the combination are a superset of downlink subframes of the uplink-downlink configuration for the primary cell of the combination; and a third IOT indication that indicates whether or not a third set of uplink/downlink configuration combinations for use by the primary cell and the secondary cell for the MS have been IOT tested, the third set of uplink-downlink configuration combinations include uplink-downlink configuration combinations where downlink subframes of the uplink-downlink configuration for the secondary cell of the combination are neither a subset nor a superset of downlink subframes of the uplink-downlink configuration for the primary cell of the combination.

FIG. 1 is a block diagram of a wireless network 130 according to an example implementation. In the wireless network 130 of FIG. 1, a mobile station (MS) 132, which may also be referred to as a user equipment (UE), may be connected (and in communication) with one or more base stations (BSs), which may also be referred to as enhanced Node Bs (eNBs), such as BS 134. The BS 134 may provide wireless coverage within multiple cells, such as a primary cell 136 and a secondary cell 140.

According to an example implementation, the MS 132 may communicate using carrier aggregation in which the MS 132 may transmit signals to or receive signals from BS 134 via multiple carriers. FIG. 1 illustrates an example of intra-BS (or intra-eNB) carrier aggregation in which MS 132 is in communication with BS 134 via a primary cell 136 using a primary component carrier and is in communication with BS 134 via secondary cell 140 using a secondary component carrier. Carrier aggregation, where multiple carriers may be aggregated for a MS or UE, may allow data to be transmitted to/from the same MS or UE, thereby allowing increased bitrate or higher bandwidth, and/or allow some of the traffic load to/from the MS to be shifted from a primary cell to a secondary cell, for example. In carrier aggregation, each aggregated carrier may be referred to as a component carrier. While FIG. 1 illustrates an example of intra-BS carrier aggregation, inter-BS (or inter-eNB) carrier aggregation may be provided as well in which a primary cell (via a primary component carrier) and a secondary cell (via a secondary component carrier) may be provided by a primary BS and a secondary BS, respectively. Each cell may include several channels for transmitting data and control signals. For example, both a primary cell and a secondary cell may include a physical downlink control channel (PDCCH) for transmitting control signals from a BS to a MS, a physical downlink shared channel (PDSCH) for transmitting downlink data to the MS, a physical uplink shared channel (PUSCH) for transmitting data from the MS to a cell or BS. Also, according to one example implementation, only the primary cell (and primary component carrier) may include a physical uplink control channel (PUCCH) for transmitting some control signals in an uplink direction from the MS to the primary cell/primary BS. The PUCCH may include downlink HARQ (Hybrid Automatic Repeat Request) Acknowledgements (Acks) or Negative Acknowledgements (Naks) to acknowledge receipt or non-receipt of downlink data. Because, according to an example implementation, in carrier aggregation, only the primary cell typically includes a PUCCH, Acks/Naks on the PUCCH may acknowledge (Ack) or negatively acknowledge (Nak) data received downlink from both the primary component carrier and the secondary component carrier. Similarly, according to one example implementation, downlink Ack/Naks for uplink data may be transmitted via a PHICH (Physical Hybrid ARQ Indicator Channel) channel.

Uplink and Downlink transmission resources (scheduling grants) are scheduled by a BS to a MS by the BS transmitting a downlink control information (DCI) via a PDCCH, which may include a MCS (modulation and coding scheme for the resource allocation), a description of the resources for the allocation (e.g., identification of resources, such as identification of physical resource blocks), and a carrier indicator field (e.g., in the case of cross-carrier scheduling).

For carrier aggregation, there are two ways in which resources (or resource grants) may be scheduled, according to an example implementation. First, in the case of same-carrier scheduling (or self scheduling), signals provided on the PDCCH on a component carrier assigns uplink resources (resources on PUSCH channel) and downlink resources (resources on PDSCH channel) on the same component carrier. Thus, for example, a PDCCH of a secondary component carrier may schedule uplink or downlink resource grants for the same secondary component carrier.

Second, in the case of cross-carrier scheduling, the PDCCH of a first component carrier may assign or schedule uplink (e.g., PUSCH) resources or downlink (PDSCH) resources for another component carrier. For example, a primary cell 136, via the PDCCH of the primary component carrier, may schedule or assign resources (or resource grants) for uplink resources (PUSCH) or downlink resources (PDSCH) for secondary component carrier (associated with secondary cell 140). For example in the case of cross-carrier scheduling, the resource grant on a PDCCH may identify the resources (e.g., physical resource blocks), the MCS (modulation and coding scheme of the scheduled resources), and the carrier (e.g., via a carrier indicator field) for which the resources are assigned. Resources on a primary component carrier may not be cross-carrier scheduled by a PDCCH of a secondary component carrier. Therefore, cross-carrier scheduling typically includes resources for a secondary component carrier being scheduled by a PDCCH of a primary component carrier or another secondary component carrier, for example.

Figure 2:
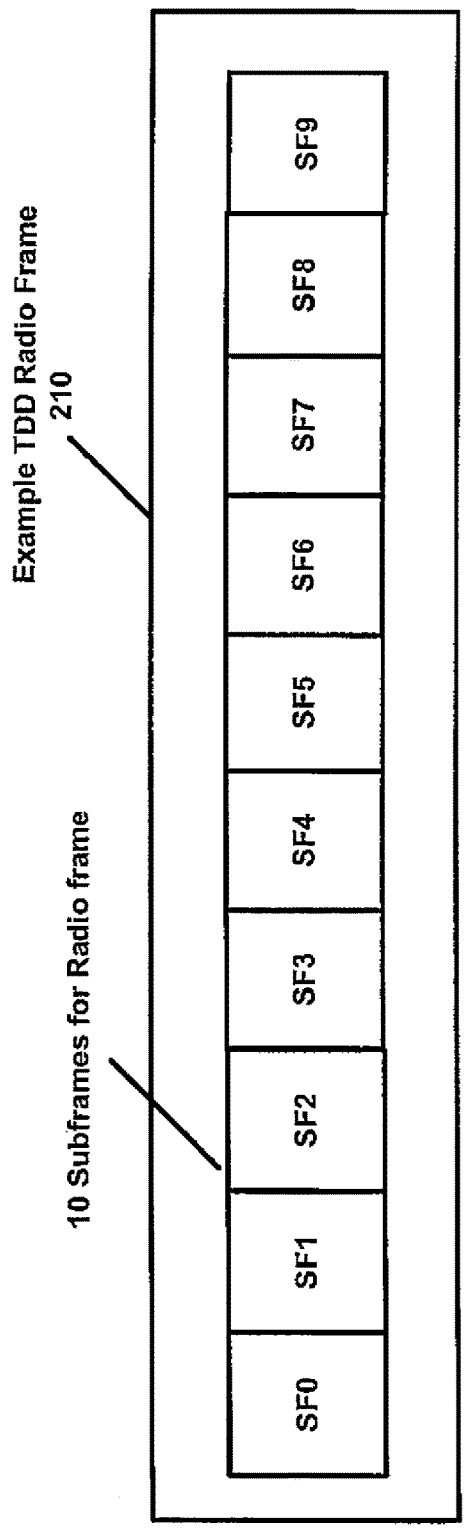
FIG. 2 is a diagram illustrating a time-division duplex (TDD) radio frame according to an example implementation.

FIG. 2 is a diagram illustrating a time-division duplex (TDD) radio frame according to an example implementation. The radio frame 210 may include multiple sub frames (SFs). In this example, radio frame 210 includes 10 subframes (subframes 0-9), including SF0, SF1, SF2, SF3, SF4, SF5, SF6, SF7, SF8 and SF9. For example, in the case of time-division duplex, a single carrier frequency is used, and uplink and downlink transmission are separated in time. With respect to the radio frame 210, each subframe may be allocated as either a downlink subframe, an uplink subframe, or a special subframe according to existing UL-DL configurations as shown in table 1. A switch from downlink to uplink occurs in a special subframe. A special sub-frame includes a downlink pat (DwPTS), a guard period (GP) and an uplink part. (UpPTS). The amount and timing (or location within the radio frame) of resources allocated to uplink transmission and downlink transmission may be varied according to different uplink-downlink (UL-DL) configurations for the TDD radio frame.

Table 1 identifies seven example UL-DL configurations for a TDD radio frame (where D indicates downlink subframe, U indicates uplink subframe, and S indicates special subframe). In this illustrative example, subframes 0 and 5 are always downlink subframes, and subframe 2 is always an uplink subframe, and subframe 1 is always a special subframe. However, in this example, the other subframes may be flexibly allocated to either uplink or downlink transmission, as shown by the different UL-DL configurations of Table 1. These different UL-DL configurations may allow more resources for UL transmission, or more resources for DL transmissions, depending on the needs of the cell. In general, BSs may use different UL-DL configurations, e.g., based on different needs or traffic demands at each cell or BS.

TABLE 1

UL-DL Configurations for TDD Radio Frame

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

According to an example implementation, when carrier aggregation is used for a MS, the primary cell and secondary cells may use different UL-DL configurations for the TDD radio frame. In general, with 7 different UL-DL configurations for a radio frame, there may be 7×7=49 different UL-DL configuration combinations used by a primary cell and a secondary cell where carrier aggregation is used for a MS. As noted above, inter-operability testing may be performed to confirm that a device or system (e.g., hardware and/or software of a MS or BS) operate in a manner that is compliant with the standard, e.g., LTE.

According to one example implementation, inter-operability testing may be performed for one or more of the UL-DL configuration combinations, and the MS may send IOT (inter-operability test) information to the BS to indicate which UL-DL configuration combinations have been IOT tested (e.g., meaning that the system/device passed the IOT test). For example, an IOT bit for each of the 49 different configuration combinations (or at least some of them) may be set to 1 to indicate that such configuration combination has been IOT tested, for example. In this manner, a primary cell may select, for example, a UL-DL configuration of a UL-DL configuration combination that has been IOT tested by the MS for carrier aggregation. The secondary cell may likewise only choose a UL-DL configuration from a configuration combination that was reported by the MS as being IOT tested, for example. Therefore, in the case of intra-BS carrier aggregation, the BS may select a UL-DL configuration combination to be used by primary cell and secondary cell that was indicated by MS as being IOT tested.

One UL-DL configuration combination for carrier aggregation may include a primary cell using UL-DL configuration 0, and the secondary cell using UL-DL configuration 2 (See Table 1). For example, if a MS was IOT tested for this configuration combination (UL-DL configuration 0 for the primary cell and a UL-DL configuration 2 for a secondary cell) for carrier aggregation, a 1 may be provided in an IOT field or bit for that associated UL-DL configuration combination. Such IOT test information for UL-DL configuration combinations may be included within capability information that may be sent or communicated to a BS, for example. The IOT information may alternatively be included in other messages.

According to another example implementation, other techniques may be used to report IOT information for UL-DL configuration combinations where carrier aggregation is used for a MS. According to an example implementation, some sets (or sub-sets) of the UL-DL configuration combinations may be grouped together because such configuration combinations have some common characteristics, e.g., where a system or device (such as a physical layer of a device/system for a MS) would perform processing for such sets of UL-DL configuration combinations in a same or similar manner. For example, the UL-DL configuration combinations may be divided into multiple (e.g., three) different sets based on the overlap of DL subframes between an UL-DL configuration for a secondary cell and the DL subframes of a primary cell, for the combination. Therefore, according to an example implementation, three different sets of UL-DL configuration combinations for carrier aggregation may be IOT tested. And, an IOT indication may then be provided by a MS to one or more BSs, for each of the three sets of configuration combinations, to indicate whether or not each set of UL-DL configuration combinations has been IOT tested.

According to another example implementation, inter-operability testing may be performed for each of multiple sets (e.g., three sets) of UL-DL configuration combinations, and then the MS may transmit or send to a BS an IOT indication for each of these three sets of UL-DL configuration combinations to indicate that IOT test was performed (or not) for each of these three sets. In this manner, by grouping the UL-DL configuration combinations, e.g., into three sets of configuration combinations, IOT indications may be provided by a MS to a BS in a much more efficient or compact manner, e.g., 3 bits instead of 49 bits (or 3 bits instead of one bit per configuration combination).

According to an example implementation, a first set of uplink-downlink configuration combinations may include uplink-downlink configuration combinations where downlink subframes of the uplink-downlink configuration for the secondary cell of the combination are a subset of downlink subframes of the uplink-downlink configuration for the primary cell of the combination. For example, a combination that is included in this first set includes where the primary cell uses UL-DL configuration 2, and the secondary cell uses UL-DL configuration 0. In such combination, as shown by Table 1, subframes and 5 are downlink subframes for UL-DL configuration 0, while subframes 0, 3, 4, 5 and 8 are downlink for UL-DL configuration 2. Thus, the downlink subframes of configuration 0 (subframes 0 and 5) are a subset of the downlink subframe of configuration 2 (subframes 0, 3, 4, 5 and 8). This is merely one example, and there are other configuration combinations for this first set of UL-DL configuration combinations.

According to an example implementation, a second set of uplink-downlink configuration combinations may include uplink-downlink configuration combinations where downlink subframes of the uplink-downlink configuration for the secondary cell of the combination are a superset of downlink subframes of the uplink-downlink configuration for the primary cell of the combination. For example, a combination that is included in this first set includes where the primary cell uses UL-DL configuration 0, and the secondary cell uses UL-DL configuration 1. In such a combination, the downlink subframes of configuration 1 (subframes 0, 4, 5 and 9) are a superset of the downlink subframe of configuration 0 (subframes 0 and 5). This is merely one example, and there are other configuration combinations for this second set of UL-DL configuration combinations.

According to an example implementation, a third set of uplink-downlink configuration combinations may include uplink-downlink configuration combinations where downlink subframes of the uplink-downlink configuration for the secondary cell of the combination are neither a subset nor a superset of downlink subframes of the uplink-downlink configuration for the primary cell of the combination. For example, a combination that is included in this third set includes where the primary cell uses UL-DL configuration 1, and the secondary cell uses UL-DL configuration 3. In such a combination, the downlink subframes of configuration 3 (subframes 0, 5, 6, 7, 8 and 9) are neither a subset nor a superset of the downlink subframes of configuration 1 (subframes 0, 4, 5 and 9). This is merely one example, and there are other configuration combinations for this third set of UL-DL configuration combinations.

According to an example implementation, IOT testing one configuration combination within a set of the UL-configuration combinations may be sufficient to provide an IOT indication for such set that indicates that the set of configuration combinations were IOT tested. In other example implementations, additional (or even all) of the configuration combinations of each set may be required before providing or setting the associated IOT indication.

Figure 3:
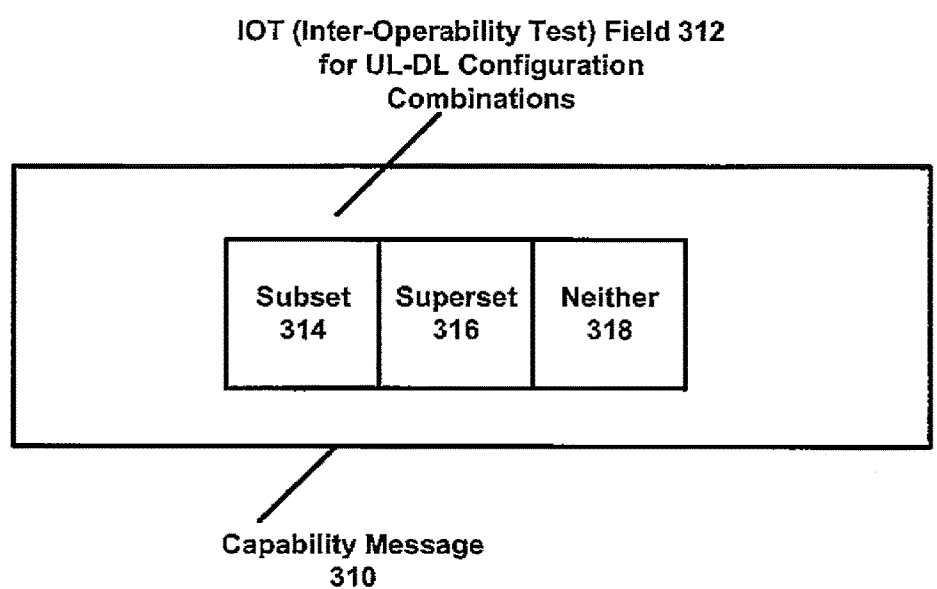
FIG. 3 is a diagram illustrating an inter-operability test (IOT) field according to an example implementation.

FIG. 3 is a diagram illustrating an inter-operability test (IOT) field according to an example implementation. According to one example implementation, IOT field 312 may provide an IOT indication for each of one or more UL-DL configuration combinations.

In another example implementation, IOT field 312 may provide an IOT indication for each of a plurality of sets of UL-DL configuration combinations, where each set may include a plurality of UL-DL configuration combinations, for example. For example, IOT field 312 may include a bit for each UL-DL configuration combination, or a bit for each set of UL-DL configuration combinations, as examples.

IOT field 312 may, for example be sent by a MS to a BS, and be provided (or included) within a capability message 310 or other message. IOT field 312 may include, for example, a sub-field (e.g., bit) for each of the three sets of UL-DL configuration combinations, e.g., to indicate whether or not each of the 3 sets of UL-DL configuration combinations is (or has been) IOT tested. For example, the IOT field 312 may include a subset field 314, a superset field 316 and a neither field 318. However, fields 314, 316 and 316 may have any names, and these are merely examples. For example, fields 314, 316 and 318 may be referred to as IOT1 (to provide IOT indication for a first set of UL-DL configuration combinations), IOT2 (to provide IOT indication for a second set of UL-DL configuration combinations) and IOT3 (to provide IOT indication for a third set of UL-DL configuration combinations).

For example, subset field 314 may indicate whether or not the first set of UL-DL configuration combinations have been IOT tested. For example, the first set may include UL-DL configuration combinations where, for each combination in the first set, the downlink subframes of the secondary cell UL-DL configuration are a subset of the downlink subframes of the primary cell UL-DL configuration.

Superset field 316 field may indicate whether or not the second set of UL-DL configuration combinations have been IOT tested. For example, the second set may include UL-DL configuration combinations where, for each combination in the second set, the downlink subframes of the secondary cell UL-DL configuration are a superset of the downlink subframes of the primary cell UL-DL configuration.

Neither field 318 may indicate whether or not the third set of UL-DL configuration combinations have been IOT tested. For example, the third set may include UL-DL configuration combinations where, for each combination in the third set, the downlink subframes of the secondary cell UL-DL configuration are neither a subset nor a superset of the downlink subframes of the primary cell UL-DL configuration. The IOT field 312 is merely one example, and other implementations may be used.

FIG. 4 is a chart that identifies the UL-DL configuration combinations for each of the three sets of configuration combinations according to an example implementation. The chart of FIG. 4 includes primary cell (Pcell) SIB1 UL-DL configuration on the top or horizontal row, and the secondary cell (Scell) SIB1 UL-DL configuration as the vertical row on the left. The SIB1 is the system information block in which the BS notifies the MSs of the UL-DL configuration that the BS has selected for use.

In FIG. 4, the first set, second set and third set of configuration combinations are shown as combination case A, combination case B, and combination case C, respectively. Therefore, the first set (for each combination, secondary cell DL subframes are a subset of the primary cell DL subframes) is shown as case A. Each of the configuration combinations that satisfies this condition is identified in FIG. 4 with the letter "A". The second set (for each combination, secondary cell DL subframes are a superset of the primary cell DL subframes) is shown as case B. Each of the configuration combinations that satisfies this condition is identified in FIG. 4 with the letter "B". The third set (for each combination, secondary cell DL subframes are neither a subset nor a superset of the primary cell DL subframes) is shown as case C. Each of the configuration combinations that satisfies this condition is identified in FIG. 4 with the letter "C".

According to an example implementation, it is also possible to have one more bit to split case A and case D in FIG. 8.

FIGS. 5-8 identify sub-cases for the cases A, B and C of FIG. 4. FIGS. 5-8 identify the reference UL-DL scheduled to be used for the secondary cell HARQ Ack/Naks for the cases of self-scheduling and cross-carrier scheduling, for both UL data and DL data transmissions. In each box of FIGS. 5-8, the letter (A, B, C or D) in each box is followed by a number, where the letter identifies the sub-case, while the number following the letter identifies the reference UL-DL configuration to be used for deriving HARQ Ack/Naks timing for the secondary cell. The letters A, B, C and D (in FIGS. 5-8) do not correspond to cases A, B and C shown in FIG. 4, but are used to describe different sub-gases for cases A, B and C shown in FIG. 4.

For example, a reference UL-DL configuration may be used for deriving HARQ Ack/Naks timing for a secondary cell where the UL-DL configuration of the primary cell (e.g., based on conflicts between the primary and secondary cell UL-DL configurations) may require to be used as the reference UL-DL configuration for the secondary cell Ack/Naks. The reference UL-DL configuration may also be used for the secondary cell since ULAck/Naks are sent only via the PUCCH on the primary component carrier, for example. Therefore, the UL-DL configuration used by the primary cell may impact the timing of Ack/Naks for the secondary cell.

FIG. 5 is a chart identifying reference UL-DL configurations to be used by a secondary cell (SCell) for DL HARQ timing (downlink data via PDSCH, and UL Ack/Naks) for self (or same-carrier)-scheduling case, according to an example implementation. FIG. 6 is a chart identifying reference UL-DL configurations to be used by a secondary cell (SCell) for DL HARQ timing (downlink data via PDSCH, and ULAck/Naks) for Cross-Carrier scheduling case, according to an example implementation. The letter (e.g., A, B or C) in the charts of FIGS. 5 and 6 identifies the set (either subset, superset, or neither, respectively, as shown by FIG. 4). The number following a letter in the chart identifies a reference UL-DL configuration which the secondary cell (or SCell) PDSCH HARQ timing follows. In other words, for downlink data transmitted via PDSCH channel, the reference UL-DL configuration identifies the timing for the ULAck/Naks. FIG. 5 illustrates the same-carrier scheduling case, while FIG. 6 illustrates the cross-carrier scheduling case.

According to an example implementation for carrier aggregation (involving two or more cells), for DL HARQ timing (downlink data via PDSCH and ULAck/Naks via PUCCH), the combination of cells may be referred to as SCell cell and PCell cell. This is because PUCCH (physical uplink control channel which provides ULAck/Naks) can only be transmitted in Pcell (via primary component carrier), so the combination must include the primary cell (Pcell). For UL HARQ timing (UL data via PUSCH, DLAck/Naks), the combination of cells may be referred to as a scheduled cell and a scheduling cell, scheduling cell can be Scell, i.e., SCell can schedule another Scell, if multiple carriers are available. If only two cells are aggregated, the scheduled cell and scheduling cell may be referred to as a secondary cell (Scell) and primary cell (Pcell), respectively.

FIG. 7 is a chart identifying reference UL-DL configurations to be used by a scheduled cell for UL HARQ timing (uplink data via PUSCH, and DL Ack/Naks) for self (or same-carrier)-scheduling case, according to an example implementation. FIG. 8 is a chart identifying reference UL-DL configurations to be used by a scheduled cell for UL HARQ timing (uplink data via PUSCH, and DLAck/Naks) for Cross-Carrier scheduling case, according to an example implementation. The letter (e.g., A, B or C) in the charts of FIGS. 7 and 8 identifies the set (either subset, superset, or neither, respectively, as shown by FIG. 4). The letter D corresponds to a fourth set of UL-DL configuration combinations. The number following a letter in the chart identifies a reference UL-DL configuration which the scheduled cell PUSCH HARQ timing follows. In other words, for uplink data transmitted via PUSCH channel, the reference UL-DL configuration identifies the timing for the DL Ack/Naks. FIG. 7 illustrates the same-carrier scheduling case, while FIG. 8 illustrates the cross-carrier scheduling case.

In FIGS. 7 and 8, the letter D refers to a fourth case, or case D, where cases A and D in FIG. 7 or 8 correspond to case B in FIG. 4. Case A in FIGS. 7 and 8 is Scell DL subframes are superset of Pcell DL subframes, and HARQ RTT (round trip time) for Pcell configuration is 10 ms; case D in FIGS. 7-8 is Scell DL subframes are a superset of Pcell DL subframes, and HARQ RTT for Pcell configuration is not 10 ms. Therefore, case A and case D in FIGS. 7-8 may be split by using different bits.

The letters A, B, C and D (in FIGS. 5-8) do not correspond to cases A, B and C shown in FIG. 4, but are used to show different sub-cases corresponding to case A, case B, and case C shown in FIG. 4.

Therefore, according to an example implementation, the primary cell (Pcell) and secondary cell (Scell) UL/DL configuration combinations may be classified into the following sets or cases, and an IOT indication may be provided separately for each set or case:

Case A (corresponding to case A in FIGS. 4-8): Secondary cell (SCell) DL subframes are a subset of primary cell (PCell) SIB1 configuration DL subframes (PCell DL heavy (e.g., PCell has more DL subframes than Scell), e.g. PCell with configuration #2, SCell with configuration #0). Case A may include two example sub-cases, including:

1) Self-scheduling: DL reference configuration for SCell is PCell SIB1 configuration (Case A in FIG. 5); and, UL reference configuration for SCell is SCell SIB1 configuration (Case B in FIG. 7).
2) Cross-scheduling: DL reference configuration for SCell is PCell SIB1 configuration (Case A in FIG. 6); and, UL reference configuration for SCell is scheduled cell (SCell) SIB1 configuration (Case B in FIG. 8). Also, PHICH-less operation may be provided (operation without PHICH channel may be provided). PHICH-less operation may include, for example, if PHICH is unavailable on the secondary cell to send Ack/Naks for secondary cell PUSCH channel, then the MS may assume that all data has been acknowledged.

Case B: SCell DL subframes are a superset of PCell by SIB1 configuration (PCell UL heavy (PCell has more UL subframes than SCell), e.g. PCell with configuration #0, SCell with configuration #2, as shown in case B of FIG. 4).
1) Self-scheduling: DL reference configuration for SCell is SCell SIB1 configuration (Case B in FIG. 5); and, reference configuration for SCell is SCell SIB1 configuration (Case A+D in FIG. 7).
2) Cross-scheduling: DL reference configuration for SCell is PCell SIB1 configuration (Case B in FIG. 6); and, UL reference configuration for SCell is scheduling cell (PCell) SIB1 configuration (Case A in FIG. 8) or scheduled cell (SCell) SIB1 or some pre-defined configuration (e.g., UL-DL configuration #1, Table 1) depending on the combination (Case D in FIG. 8).

Case C: SCell DL subframes are neither superset nor subset of PCell DL subframes by SIB1 configuration (e.g., PCell with UL-DL configuration #2, SCell with UL-DL configuration #3, as shown in case C of FIG. 4).
1) Self-scheduling: DL reference configuration for SCell is an UL/DL configuration that is different from PCell/SCell SIB1 configuration (pre-defined) (Case C in FIG. 5); and UL reference configuration for SCell is SCell SIB1 configuration (Case C in FIG. 7).
2) Cross-scheduling: DL reference configuration for SCell is PCell SIB1 configuration (Case C in FIG. 6); and, UL reference configuration for SCell is scheduled cell (SCell) SIB1 configuration (Case C in FIG. 8). Also, PHICH-less operation may be provided (operation without PHICH channel may be provided).

In an example implementation, three bits may be used to provide IOT indications, where each bit or sub-field may provide an IOT indication for each of the three cases noted above. Each bit may indicate whether the set of UL-DL configuration combinations of one of the cases (case A, B or C) have been IOT tested (IOT tested for the MS, or IOT tested for a system/device that is the same or similar to the system/device within the MS). A BS may, for example, receive the IOT indications for one or more sets of UL-DL configuration combinations, and may, for example, select an UL-DL configuration of (or that is a member of) a set of UL-DL configuration combinations that has been IOT tested. In this manner, where carrier aggregation is used, a BS, acting as either primary BS or secondary BS may select a UL-DL configuration that has been IOT tested.

Other categorization also possible, e.g. if not considering cross-scheduling which may already have a separate capability bit, case A and case B may be merged or combined and reported using a single bit (or single IOT indication). In such example implementation, only 2 bits may be needed to provide IOT indications for 1) combined cases A and B, and 3) case C.

Therefore, according to an example implementation, 3 bits may be used to provide a MS (UE) capability information or IOT indication for each of the different sets of UL-DL configuration combinations.

According to another example implementation, 4 bits may be used to provide IOT indication for the UL-DL configurations. The Case A in FIG. 4 can further divide into two set of configuration combinations, one set is same as case A in FIG. 7,8 in which the UL HARQ timing of scheduling cell is 10 ms, and another set is same as case D in FIG. 7, 8, in which the UL HARQ timing of scheduling cell is not 10 ms.

According to another example implementation, the IOT indications may only report IOT information for self-scheduling sub-cases, if a separate capability bit is provided for carrier cross-scheduling.

2 bits for UE capability/IOT indication on the combination of different TDD configurations:
1 bit indicates whether the UE support/IOT tested the TDD configuration combination of SCell DL subframes are a subset of PCell by SIB1 configuration or the combination of SCell DL subframes are a superset of PCell by SIB1 configuration;
1 bit indicates whether the UE support/IOT tested the TDD configuration combination of SCell DL subframes are neither superset nor subset of PCell by SIB1 configuration.

The indication could be per UE or per band combination (only for the CA band combinations, not needed for non-CA band combinations). For per band combination indication, the UE indicate the IOT indication for each set of TDD configuration combination for each CA band combination.

It is also possible to have separate indication for self-scheduling and cross-scheduling. For example, for self-scheduling: 1 bit IOT indication for each case (case A, B, C), or 1 bit for case A+case B and 1 bit IOT indication for case C. For cross-scheduling (which, for example, may only be needed when the MS indicates ifs capable of cross-carrier-scheduling), 1 IOT indication bit may be used for each case (case A, B, C), or 1 bit for case A+case C and 1 IOT indication bit for case B. These are merely additional example implementations, and other implementations may be used.

Table 2 (below) illustrates some example UL reference UL-DL configurations for serving cell based on the UL-DL configurations used by the serving cells. Serving cells may include a primary cell and a secondary cell in the case of carrier aggregation, for example. For TDD, if a MS is configured with more than one serving cell (e.g., carrier aggregation) and if the UL-DL configurations of at least two serving cells are different, if the serving cell is a primary cell or if the MS is not configured to monitor PDCCH in another serving cell for scheduling the serving cell, the serving cell UL/DL configuration is the UL-reference UL/DL configuration. If the serving cell is a secondary cell and if the UE is configured to monitor PDCCH/EPDCCH in another serving cell for scheduling the serving cell (i.e. the secondary cell is cross scheduled by another cell), the serving cell UL-DL configuration is the UL-reference UL-DL configuration noted in Table 2.

With respect to UL reference configurations described in Table 2, Set 1 (Table 2) may correspond to case A in FIG. 8 (e.g., Scell DL subframes are a superset of Pcell DL subframes and Pcell HARQ RTT (Round trip time) is 10 ms (and which include some of the blocks of FIG. 4)); Set 2 (Table 2) may correspond to case B in FIG. 8 (e.g., Scell DL subframes are a subset of Pcell DL subframes (also case A in FIG. 4); Set 3 (Table 2) may correspond to case C in FIG. 8 (e.g., Scell DL subframes are neither a subset nor a superset of Pcell DL subframes, which is also case C in FIG. 4); Set 4 (Table 2) may correspond to case D in FIG. 8 (e.g., Scell DL subframes are a superset of Pcell DL subframes, and Pcell HARQ RTT is not 10 ms, which may include some blocks of case B in FIG. 4). In Table 2, set 1+set 4 may be equal to full set of Scell DL subframes are a superset of Pcell DL subframes.

TABLE 2

UL-reference UL/DL Configuration for serving cell based on the pair/combination formed by (other serving cell UL-DL configuration, serving cell UL-DL configuration).

| Set # | (other serving cell UL-DL configuration, serving cell UL-DL configuration) | UL-reference UL-DL configuration |
|---|---|---|
| Set 1 | (1, 1), (1, 2), (1, 4), (1, 5) | 1 |
|  | (2, 2), (2, 5) | 2 |
|  | (3, 3), (3, 4), (3, 5) | 3 |
|  | (4, 4), (4, 5) | 4 |
|  | (5, 5) | 5 |
| Set 2 | (1, 0), (2, 0), (3, 0), (4, 0), (5, 0) | 0 |
|  | (2, 1), (4, 1), (5, 1) | 1 |
|  | (5, 2) | 2 |
|  | (4, 3), (5, 3) | 3 |
|  | (5, 4) | 4 |
|  | (1, 6), (2, 6), (3, 6), (4, 6), (5, 6) | 6 |
| Set 3 | (3, 1) | 1 |
|  | (3, 2), (4, 2) | 2 |
|  | (1, 3), (2, 3) | 3 |
|  | (2, 4) | 4 |
| Set 4 | (0, 0), (6, 0) | 0 |
|  | (0, 1), (0, 2), (0, 4), (0, 5), (6, 1), (6, 2), (6, 5) | 1 |
|  | (0, 3), (6, 3) | 3 |
|  | (6, 4) | 4 |
|  | (0, 6), (6, 6) | 6 |

Table 3 (below) illustrates some example DL reference UL-DL configurations for serving cell based on the UL-DL configurations used by the serving cells. With respect to Table 3 (DL reference configurations), according to an example implementation, for TDD, if the MS (or UE) is configured with more than one serving cell (e.g., carrier aggregation) and if at least two serving cells have different UL-DL configurations and if a serving cell is a primary cell, then the primary cell UL-DL configuration is the DL-reference UL-DL configuration for the serving cell.

For TDD if the UE is configured with more than one serving cell and if at least two serving cells have different UL/DL configurations and if a serving cell is a secondary cell:
 if the pair formed by (primary cell UL-DL configuration, serving cell UL-DL configuration) belongs to Set 1 in Table 3, or
 if the MS (or UE) is not configured to monitor PDCCH in another serving cell for scheduling the serving cell, and if the pair formed by (primary cell UL-DL configuration, serving cell UL-DL configuration) belongs to Set 2 or Set 3 in Table 3, or
 if the MS (or UE) is configured to monitor PDCCH in another serving cell for scheduling the serving cell, and if the pair formed by (primary cell UL-DL configuration, serving cell UL-DL configuration) belongs to Set 4 or Set 5 in Table 3,
 then the DL-reference UL-DL configuration for the serving cell is defined in the corresponding Set in Table 3, according to one example implementation.

For TDD if a MS is configured with more than one serving cell and if at least two serving cells have different UL-DL configurations and if the DL-reference UL-DL configuration for at least one serving cell is TDD UL-DL Configuration 5 (Table 1), then the MS is not expected to be configured with more than two serving cells.

With respect to DL-reference configurations described in Table 3, set 1 may correspond to case A in FIG. 5 and FIG. 6 (e.g., Scell DL subframes are a subset of Pcell DL subframes, for both cross-carrier scheduling and same carrier scheduling); Set 2 (Table 3) may correspond to case B in FIG. 5 (e.g., Scell DL subframes are a superset of PCell DL subframes, with same carrier scheduling (case B in FIG. 4)); Set 3 (Table 3) may correspond to case C in FIG. 5 (e.g., Scell DL subframes are neither superset nor subset of Pcell DL subframes, with same carrier scheduling (case C in FIG. 4)); Set 4 (Table 3) may correspond to case B in FIG. 6 (e.g., Scell DL subframes are a superset of Pcell DL subframes, with cross-carrier scheduling (case B in FIG. 4); and, Set 5 (Table 3) may correspond to case C in FIG. 6 (e.g., Scell DL subframes are neither superset nor subset of Pcell DL subframes, with cross-carrier scheduling (case C in FIG. 4)).

TABLE 3

DL-reference UL-DL configuration for serving cell based on pair/combination formed by (primary cell UL-DL configuration, secondary cell UL-DL configuration).

| Set # | (Primary cell UL/DL configuration, Secondary cell UL/DL configuration) | DL-reference UL/DL configuration |
|---|---|---|
| Set 1 | (0, 0) | 0 |
|  | (1, 0), (1, 1), (1, 6) | 1 |
|  | (2, 0), (2, 2), (2, 1), (2, 6) | 2 |
|  | (3, 0), (3, 3), (3, 6) | 3 |
|  | (4, 0), (4, 1), (4, 3), (4, 4), (4, 6) | 4 |
|  | (5, 0), (5, 1), (5, 2), (5, 3), (5, 4), (5, 5), (5, 6) | 5 |
|  | (6, 0), (6, 6) | 6 |
| Set 2 | (0, 1), (6, 1) | 1 |
|  | (0, 2), (1, 2), (6, 2) | 2 |
|  | (0, 3), (6, 3) | 3 |
|  | (0, 4), (1, 4), (3, 4), (6, 4) | 4 |
|  | (0, 5), (1, 5), (2, 5), (3, 5), (4, 5), (6, 5) | 5 |
|  | (0, 6) | 6 |
| Set 3 | (3, 1), (1, 3) | 4 |
|  | (3, 2), (4, 2), (2, 3), (2, 4) | 5 |
| Set 4 | (0, 1), (0, 2), (0, 3), (0, 4), (0, 5), (0, 6) | 0 |
|  | (1, 2), (1, 4), (1, 5) | 1 |
|  | (2, 5) | 2 |
|  | (3, 4), (3, 5) | 3 |
|  | (4, 5) | 4 |
|  | (6, 1), (6, 2), (6, 3), (6, 4), (6, 5) | 6 |
| Set 5 | (1, 3) | 1 |
|  | (2, 3), (2, 4) | 2 |
|  | (3, 1), (3, 2) | 3 |
|  | (4, 2) | 4 |

Tables 2 and 3 are merely illustrative example implementations for reference UL-DL configurations, and other implementations may be used.

Figure 9:
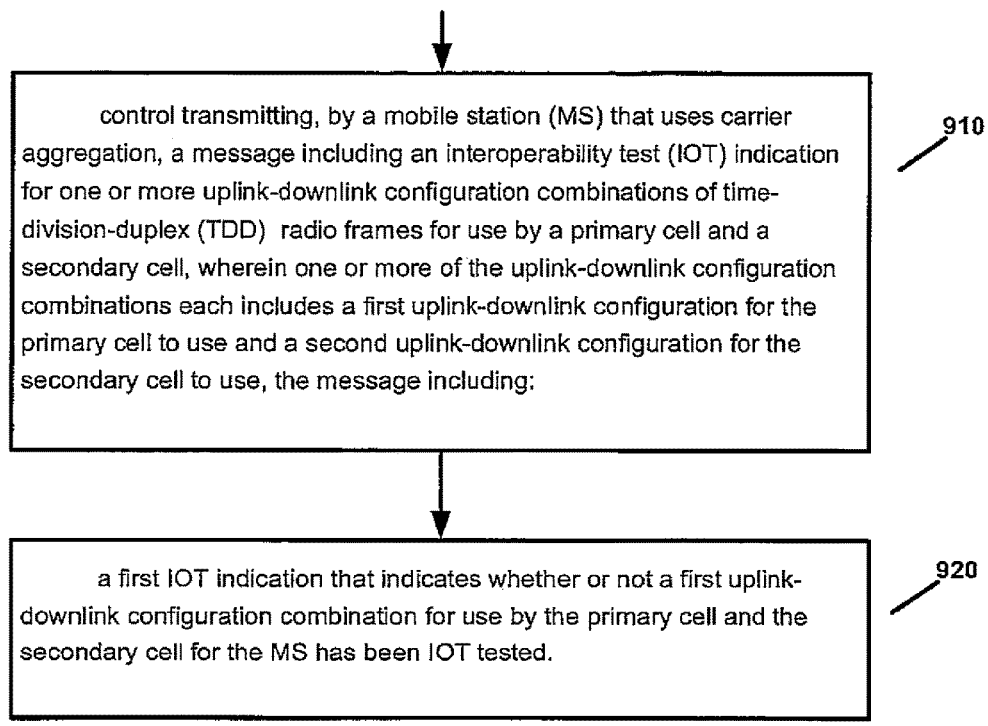
FIG. 9 is a flow chart illustrating operation of a mobile station according to an example implementation.

FIG. 9 is a flow chart illustrating operation of a mobile station according to an example implementation. Operation 910 includes transmitting or control transmitting, by a mobile station (MS) that uses carrier aggregation, a message including an interoperability test (IOT) indication for one or more uplink-downlink configuration combinations of time-division-duplex (TDD) radio frames for use by a primary cell and a secondary cell, wherein one or more of the uplink-downlink configuration combinations each includes a first uplink-downlink configuration for the primary cell to use and a second uplink-downlink configuration for the secondary cell to use.

At operation 920, the message includes a first IOT indication that indicates whether or not a first uplink-downlink configuration combination for use by the primary cell and the secondary cell for the MS has been IOT tested.

Figure 10:
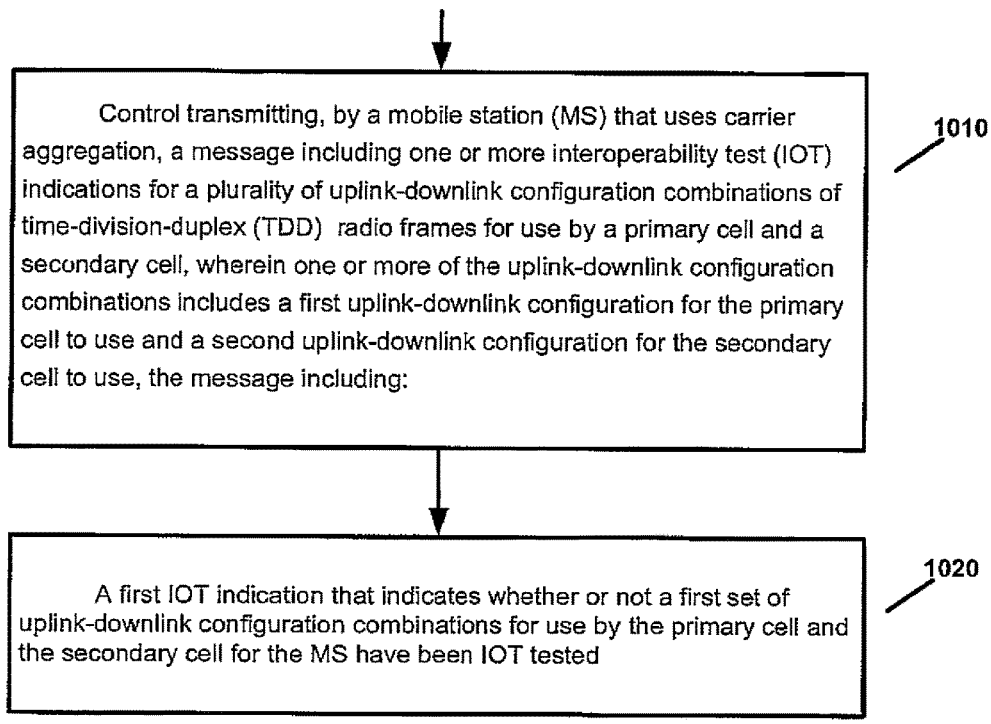
FIG. 10 is a flow chart illustrating operation of a mobile station according to another example implementation.

FIG. 10 is a flow chart illustrating operation of a mobile station according to an example implementation. Operation 1010 includes transmitting or control transmitting control transmitting, by a mobile station (MS) that uses carrier aggregation, a message including one or more interoperability test (IOT) indications for a plurality of uplink-downlink configuration combinations of time-division-duplex (TDD) radio frames for use by a primary cell and a secondary cell, wherein one or more of the uplink-downlink configuration combinations includes a first uplink-downlink configuration for the primary cell to use and a second uplink-downlink configuration for the secondary cell to use. At operation 1020, the message includes a first IOT indication that indicates whether or not a first set of uplink-downlink configuration combinations for use by the primary cell and the secondary cell for the MS have been IOT tested.

Figure 11:
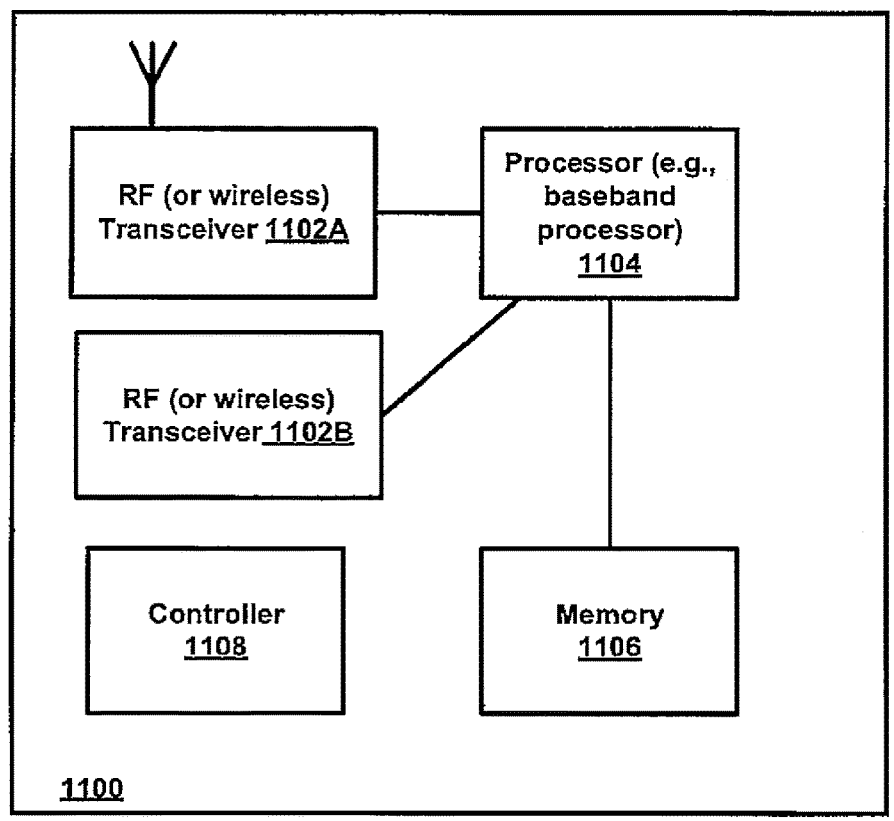
FIG. 11 is a block diagram of a wireless station (e.g., BS or MS) 1100 according to an example implementation.

FIG. 11 is a block diagram of a wireless station (e.g., BS or MS) 1100 according to an example implementation. The wireless station 1100 may include, for example, two RF (radio frequency) or wireless transceivers 1102A, 1102B, where each wireless transceiver includes a transmitter to transmit signals and a receiver to receive signals. The wireless station also includes a processor 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, control the transmitting and receiving of packets or data, and other tasks or functions described herein. Processor 1104, which may be a baseband processor, for example, may generate messages, packets, frames or other signals for transmission via wireless transceiver 1102. Processor 1104 may control transmission of signals or messages over a wireless network, and may control receiving signals or messages, etc., via a wireless network (e.g., after being down-converted by wireless transceiver 1102, for example). Thus, processor 1104, as an example, may control transmitting and control receiving of data or signals. Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
  receiving, from a mobile station that uses carrier aggregation, a message including one or more interoperability test indications for a plurality of uplink-downlink configuration combinations of time-division-duplex radio frames for use by a primary cell and a secondary cell, wherein one or more of the uplink-downlink configuration combinations includes a first uplink-downlink configuration for the primary cell to use and a second uplink-downlink configuration for the secondary cell to use, the message comprising one of:
    a first interoperability test indication that indicates whether or not a first set of uplink-downlink configuration combinations for use by the primary cell and the secondary cell for the mobile station have been interoperability tested, and
    a first interoperability test indication that indicates whether or not a first uplink-downlink configuration combination for use by the primary cell and the secondary cell for the mobile station has been interoperability tested; and
  transmitting and/or receiving wireless radio frequency signals with the mobile station via multiple carriers in accordance with an uplink-downlink configuration combination based at least in part on the first interoperability test indication.

2. The method of claim 1, wherein:
  the first set of uplink-downlink configuration combinations comprises all possible uplink-downlink configuration combinations or a subset of all possible uplink-downlink configuration combinations.

3. The method of claim 2, wherein the message includes a plurality of bits including:
  a first bit to indicate whether the mobile station supports a time-division-duplex configuration combination where downlink subframes of the secondary cell are either a subset of a system information block 1 (SIB1) uplink-downlink configuration of the primary cell or where downlink subframes of the secondary cell are a superset of a SIB1 configuration of the primary cell; and
  a second bit to indicate whether the mobile station supports a time-division-duplex configuration combination where downlink subframes of the secondary cell are neither a subset nor a superset of a SIB1 uplink-downlink configuration of the primary cell.

4. The method of claim 1, wherein the message further comprises:
  a second interoperability test indication that indicates whether or not a second set of uplink-downlink configuration combinations for use by the primary cell and the secondary cell for the mobile station have been interoperability test tested.

5. The method of claim 4, wherein:
  the message includes an interoperability test field that includes a plurality of bits including a first bit to provide the first interoperability test indication and a second bit to provide the second interoperability test indication.

6. The method of claim 4, wherein:
  the second set of uplink-downlink configuration combinations comprise uplink-downlink configuration combinations where downlink subframes of the uplink-downlink configuration for the secondary cell of the combination are a superset of downlink subframes of the uplink-downlink configuration for the primary cell of the combination.

7. The method of claim 1, wherein:
  each of the uplink-downlink configurations specifies one or more subframes of the radio frame as a downlink subframe and one or more subframes of the radio frame as an uplink subframe.

8. The method of claim 1, wherein:
  the first set of uplink-downlink configuration combinations comprise uplink-downlink configuration combinations where downlink subframes of the uplink-downlink configuration for the secondary cell of the combination are a subset of downlink subframes of the uplink-downlink configuration for the primary cell of the combination.

9. The method of claim 1, wherein:
  each of the uplink-downlink configurations specifies a configuration of a time-division-duplex radio frame, each of the uplink downlink configurations specifying that each subframe within a time-division-duplex radio frame is either a uplink subframe, a downlink subframe, or a special subframe.

10. An apparatus comprising:
  at least one processor, and
  at least one memory including computer instructions, when executed by the at least one processor, cause the apparatus to:
    receive, from a mobile station that uses carrier aggregation, a message including one or more interoperability test indications for a plurality of uplink-downlink configuration combinations of time-division-duplex radio frames for use by a primary cell and a secondary cell, wherein one or more of the uplink-downlink configuration combinations includes a first uplink-downlink configuration for the primary cell to use and a second uplink-downlink configuration for the secondary cell to use, the message comprising one of:
      a first interoperability test indication that indicates whether or not a first set of uplink-downlink configuration combinations for use by the primary cell and the secondary cell for the mobile station have been interoperability tested, and
      a first interoperability test indication that indicates whether or not a first uplink-downlink configuration combination for use by the primary cell and the secondary cell for the mobile station has been interoperability tested; and
    transmit and/or receive wireless radio frequency signals with the mobile station via multiple carriers in accordance with an uplink-downlink configuration combination based at least in part on the first interoperability test indication.

11. The apparatus of claim 10, wherein:
the first set of uplink-downlink configuration combinations comprises all possible uplink-downlink configuration combinations or a subset of all possible uplink-downlink configuration combinations.

12. The apparatus of claim 10, wherein the message further comprises:
a second interoperability test indication that indicates whether or not a second set of uplink-downlink configuration combinations for use by the primary cell and the secondary cell for the mobile station have been interoperability test tested.

13. The apparatus of claim 12, wherein:
the message includes an interoperability test field that includes a plurality of bits including a first bit to provide the first interoperability test indication and a second bit to provide the second interoperability test indication.

14. The apparatus of claim 12, wherein:
the second set of uplink-downlink configuration combinations comprise uplink-downlink configuration combinations where downlink subframes of the uplink-downlink configuration for the secondary cell of the combination are a superset of downlink subframes of the uplink-downlink configuration for the primary cell of the combination.

15. The apparatus of claim 10, wherein:
each of the uplink-downlink configurations specifies one or more subframes of the radio frame as a downlink subframe and one or more subframes of the radio frame as an uplink subframe.

16. The apparatus of claim 10, wherein:
the first set of uplink-downlink configuration combinations comprise uplink-downlink configuration combinations where downlink subframes of the uplink-downlink configuration for the secondary cell of the combination are a subset of downlink subframes of the uplink-downlink configuration for the primary cell of the combination.

17. The apparatus of claim 10, wherein:
each of the uplink-downlink configurations specifies a configuration of a time-division-duplex radio frame, each of the uplink downlink configurations specifying that each subframe within a time-division-duplex radio frame is either a uplink subframe, a downlink subframe, or a special subframe.

18. The apparatus of claim 10, wherein the message includes a plurality of bits including:
a first bit to indicate whether the mobile station supports a time-division-duplex configuration combination where downlink subframes of the secondary cell are either a subset of a system information block 1 (SIB1) uplink-downlink configuration of the primary cell or where downlink subframes of the secondary cell are a superset of a SIB1 configuration of the primary cell; and
a second bit to indicate whether the mobile station supports a time-division-duplex configuration combination where downlink subframes of the secondary cell are neither a subset nor a superset of a SIB1 uplink-downlink configuration of the primary cell.

19. A computer program product, the computer program product comprising a non-transitory computer-readable storage medium and storing executable code that, when executed by at least one data processing apparatus, is configured to cause the at least one data processing apparatus to perform at least:
receiving, from a mobile station that uses carrier aggregation, a message including one or more interoperability test indications for a plurality of uplink-downlink configuration combinations of time-division-duplex radio frames for use by a primary cell and a secondary cell, wherein one or more of the uplink-downlink configuration combinations includes a first uplink-downlink configuration for the primary cell to use and a second uplink-downlink configuration for the secondary cell to use, the message comprising one of:
a first interoperability test indication that indicates whether or not a first set of uplink-downlink configuration combinations for use by the primary cell and the secondary cell for the mobile station have been interoperability tested, and
a first interoperability test indication that indicates whether or not a first uplink-downlink configuration combination for use by the primary cell and the secondary cell for the mobile station has been interoperability tested; and
transmitting and/or receiving wireless radio frequency signals with the mobile station via multiple carriers in accordance with an uplink-downlink configuration combination based at least in part on the first interoperability test indication.

* * * * *